June 26, 1956 C. P. MICHLEIN 2,752,061
ELECTROMAGNETIC RIVET SETTING MACHINE
Filed April 8, 1950 2 Sheets-Sheet 1
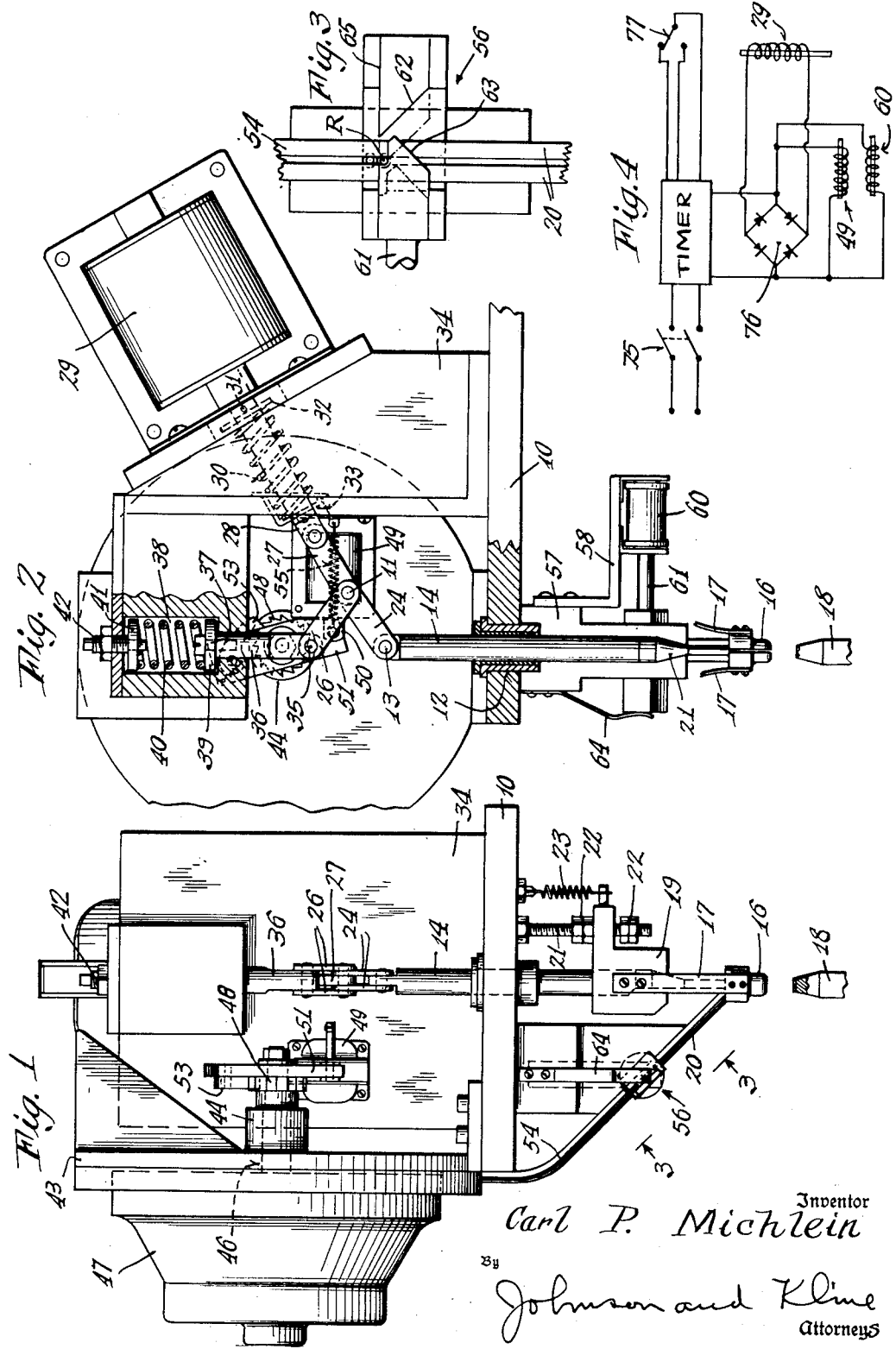
Inventor
Carl P. Michlein
By
Johnson and Kline
Attorneys

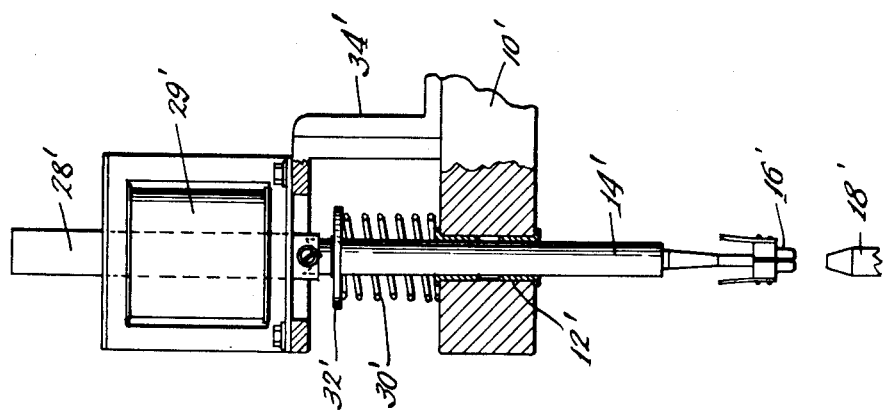
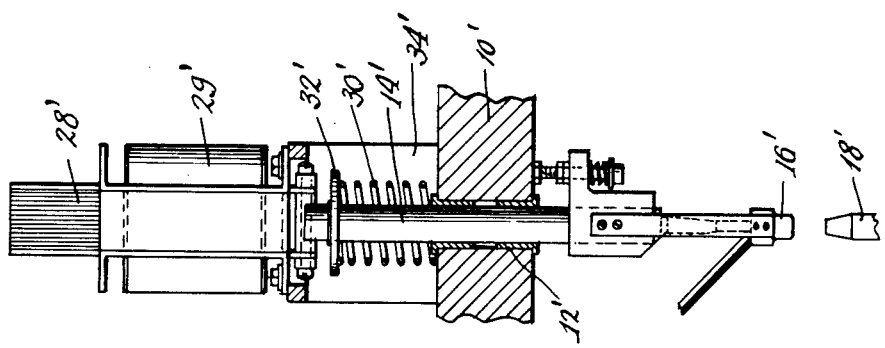

United States Patent Office 2,752,061
Patented June 26, 1956

2,752,061

ELECTROMAGNETIC RIVET SETTING MACHINE

Carl P. Michlein, Shelton, Conn., assignor to The Shelton Tack Company, Shelton, Conn., a corporation of Connecticut Application April 8, 1950, Serial No. 154,750

3 Claims. (Cl. 218—2)

This invention relates to rivet setting machines and more particularly to improvements in operating and controlling such machines.

Rivet setting, or roll setting, machines are well known in industry. They normally comprise a movable or slidable rivet driver rod which is capable of being suddenly thrust forwardly or downwardly to strike a positioned rivet and to press it with considerable power against an aligned opposed anvil. The face of the rivet driver is so shaped as to conformably seat and hold the head of the rivet during such movement. The head of the rivet may assume various forms and shapes such as round, oval, flat, etc. The other end of the rivet is tubular and is adapted to be seated on and around the central circular protuberance of the opposed anvil and to seat on the annular portion thereof so that the force of the work stroke causes a cold plastic flow of the tubular portion and an expansion thereof into an outwardly rolled configuration.

In rivet setting machines heretofore proposed, the power means employed have commonly involved continuously rotating mechanical elements such as crank shafts which necessitated the use of flywheels and connecting rods to convert the rotational energy into the reciprocating motion required in the work stroke for such machines. Constantly rotating cam shafts and cam rollers have also been used but in these and similar mechanically operating rivet setting machines, power is being continually drawn and used, even though the time in which the work stroke of rivet setting takes place is actually only a small fraction of the entire power consumption cycle. Pneumatic means have been employed for rivet setting in the past but have involved a prior accumulation of compressed air and the storage thereof in tanks or containers and the use therewith of hose lines and hose connections which entail certain disadvantages.

If rivet setting machines were operated in a manner wherein sufficiently long periods of intermission were involved, it might be feasible to stop the operation of the machine entirely during such intervals and to operate the machine only when actually necessary. Such has generally proved less efficient due to the power wasted during the time the flywheel or other rotating mechanical device is accelerating to attain operating speed from its rest position, or, in the case of a pneumatic device, of the possibility of leakage of air pressure during such intervals of rest and the lessening of the pressure available since the last period of activity. Inasmuch as the power required for rivet setting is not inconsiderable, it is obviously necessary that a constant source of sufficient, dependable power is highly desirable for efficient operation.

An object of the present invention is to provide a novel rivet setting machine capable of performance in a superior and economical manner.

Another object of the present invention is to provide a novel rivet setting machine wherein sufficient power is instantly available and is used only during the time that rivet setting is actually taking place.

Still another object of the present invention is to provide a novel rivet setting machine which is operated intermittently but for which a constant source of dependable power is continuously available.

A further and more specific object of the present invention is to utilize magnetic force to supply the power required to produce the work stroke in the rivet setting machine.

A specific object of the present invention is to utilize electromagnetic force, such as in the form of a solenoid, or an electromagnet, to directly supply the power required in the production of the work stroke in the rivet setting machine.

A further specific object of the present invention is to provide a novel rivet setting machine wherein the cooperating and related elements are actuated by electromagnetic means.

These objects are accomplished according to the present invention by the use of magnetic force as the means of accomplishing the organized movements of the related parts of the rivet setting machine. More specifically, the magnetic energy takes the form of coordinated solenoid power means to effect the various operations necessary for the complete rivet setting machine.

Other features and advantages will hereinafter appear.

In the accompanying drawings:

Figure 1 is a front elevation of a rivet setting machine embodying the present invention.

Fig. 2 is a fragmentary side elevation of the rivet setting machine of Fig. 1, partly in cross-section to show the construction of the rivet driver and overload absorber elements.

Fig. 3 is a left auxiliary fragmentary view of the underside of the machine, taken on a plane at right angles to the front elevation and indicated by the arrows 3—3, to show the construction of the rivet escapement mechanism.

Fig. 4 is a schematic wiring diagram of the rivet setting machine according to the present invention.

Fig. 5 is a fragmentary front elevation of a modification of the rivet setting machine shown in Figs. 1–4.

Fig. 6 is a fragmentary side elevation of the modification of Fig. 5.

In the riveting industry, solenoids have occasionally been used but always in the capacity of adjuncts, or subordinate to the actual riveting operation. The use of solenoids has been confined wholly to such auxiliary operations, as completing electrical circuits, or operating valves, or similar purposes ancillary to the principal object of rivet setting. They have always been used in this subservient capacity, essentially because the art has viewed them always in such a light, and thus solenoids have remained as mere assistants in the operation of rivet setting.

The power delivered to such electromagnetic devices is small and the force exerted by the plunger core when the solenoid is energized has likewise been small and usually not considered seriously, just as long as the desired electrical circuit was completed or opened, or the valves closed or opened, to actuate the mechanical or pneumatic force required for rivet setting. It has never been visualized that such force could be utilized directly and thus obviate the necessity for the intermediate mechanical or pneumatic elements. One of the reasons for such a view lies in the fact that the power requirements for rivet setting are considerable, since they involve an actual expanding or flowing of metal as the rivet is rolled and not merely a sliding movement of a small part or a deflection or bending of weak, yieldable material.

As a specific example of the power requirements involved, the minimum power required for roll setting a small rivet having a prerolled length of ¾" and a diameter of 0.140" has been measured and determined to be in excess of 1600 pounds to accomplish a roll of 0.093", thus reducing the length of the rivet to $^{21}/_{32}$", after rolling. As can be readily appreciated, such a force for even a small rivet is substantial and would be increased proportionately as larger rivets are used to a considerable figure.

Within the broader aspects of this invention, any electromagnetic device, such as a solenoid or an electromagnet, is employed to directly supply sufficient power as required for the work stroke involved in the roll setting of a rivet.

In the preferred embodiment of the invention shown in the drawings, a vertically movable rivet driver 14 is slidably mounted within a bore 12 in the head frame 10 and is capable of reciprocating motion between an upper, or readiness, position and a lower, or rivet setting, position. When the rivet driver 14 is in the upper position, which is shown in Fig. 2, one rivet R is selected by means of a rivet escapement device 56, to be hereinafter described, and is permitted to slide down the rails 20 to fall into position directly in line with and immediately below the bottom face of the rivet driver 14. The rivet R is loosely held in this position by rivet jaws 16 carried by side spring 17 mounted on bracket 19. When the rivet driver 14 is impelled downwardly from the position shown in Fig. 2 to the rivet setting position, it will strike the rivet R and drive it downwardly against the opposed anvil 18.

A resilient spring mounting is provided for the rivet holding means to cushion the shock of the initial contact between the rivet driver 14 and the rivet R.

As shown in Fig. 1, the bracket 19 carrying the side springs 17 and the rivet jaws 16 is slidably mounted upon a threaded rod 21 secured to the underside of the head frame 10. Upon rod 21 are mounted two pairs of adjustable lock nuts 22 which limit the vertical movement of the bracket 19. A tension spring 23 also secured to the underside of the head frame 10 urges bracket 19 upwardly to resiliently and yieldingly resist the downward thrust exerted by the descending rivet driver 14. Upon impact of the rivet driver 14 and the rivet R, the rivet holding means will thus yield to cushion the suddenness of the initial blow. Thus, the rivet jaws 16 are normally held in the elevated position and the materials or objects to be riveted can easily be positioned on the anvil 18 below the rivet jaws 16. When the driver 14 impels the rivet holding means downwardly, the rivet jaws will contact and hold the materials being riveted. Adjustment of the position and limits of travel of the rivet holding means is adjustable by means of the lock nuts 22, 22.

A cam surface 21 is so located on the rivet driver 14 as to spread the rivet jaws 16 apart at the proper time to permit continued movement of the rivet R past the rivet jaws 16 and against an opposed anvil 18 which is directly aligned with the rivet driver 14. The rivet R will be driven through any materials or objects placed between the rivet jaws 16 and the anvil 18 and the lowermost edges of said rivet will be curved around and roll set in conventional fashion by cooperation with the opposed face of said anvil 18.

A pair of links 24 are pivotally mounted upon the upper end of rivet driver 14 as at 13. Links 24 are, in turn, pivotally mounted at 11 to a second pair of links 26, which are similar to links 24 and comprise therewith a toggle link arrangement. At the pivotal point 11 of the toggle links 24, 26 is mounted an extension link 27 which, in turn, is pivotally secured to a power ram 28 which extends upwardly and to the right as viewed in Fig. 2 and is normally located within a power solenoid 29. The power solenoid 29 is of a commercially known "pusher" type which is capable, when energized, of very rapidly and forcibly ejecting the power ram 28.

Consideration of Fig. 2 will make it apparent that, when the power solenoid 29 is energized, the power ram 28 will be driven downwardly and to the left, thus compelling the extension link 27 to straighten or align the toggle links 24 and 26 which will impel the rivet driver 14 pivoted thereto downwardly to perform a power stroke.

When the power solenoid 29 is de-energized, the return of the power ram 28 to its initial retracted position within power solenoid 29 is accomplished by a compression spring 30 which was compressed during energization of the solenoid between a washer 32 and a pin 31 secured to power ram 28 on the one side and a recessed cup 33 formed in the bracket 34 on the other side. Any other suitable return means for the power ram 28 may be utilized within the general principles of the present invention.

As shown in Fig. 2, the power solenoid 29 is secured to a bracket 34 mounted on the head frame 10 and is positioned at an angle of 60° to the direction of movement of the rivet driver 14. This has been determined to be a preferred position due to the fact that the pivot point 11 of the toggle linkage 24, 26 does not move in a straight line when impelled by the extension link 27. Pivot point 11 moves downwardly and to the left, as shown in Fig. 2, along the circumference of a circle with the upper pivot point 35 as a center and the positioning of power solenoid 29 at an angle of 60° has been determined to result in very smooth co-action. However, this is not intended to preclude the use of the power solenoid 29 at other angles and is merely illustrated as a preferred embodiment.

The upper pair of links 26 of the toggle linkage are pivotally connected at 35 to a vertically extending rod 36 which is guided through a narrow bore 37 in a horizontal extension of bracket 34. Rod 36 extends past bore 37 into a larger recess 38. A spring seat 39 is secured as by a bolt to the top of rod 36 and a suitably heavy compression spring 40 is seated thereon. Compression spring 40 is compressed within recess 38 by a spring cap 41 which is vertically adjustable by means of a threaded rod 42, threaded through an upper horizontal extension of the bracket 30 and secured in place by a lock nut. Vertical movement of the spring cap 41 will vary the loading of the compression spring 40 and the operation of the riveting machine. The compression spring 40 is of such strength as to maintain the pivot point 35 of the toggle link 26 and the rod 36 substantially stationary during normal operation. However, should circumstances demand it, such as in the case of a rivet jam, wherein the continued descent of the rivet driver 14 would damage or break part of the rivet setting machine, the spring 40 will act as an overload absorber and be compressed and yield upwardly to permit upward movement of rod 36 and toggle linkage 24, 26 to prevent breakage of any operating parts, by thus halting the power stroke of the rivet driver 14.

As shown in Fig. 1, a circular hopper barrel 47, containing a supply of additional rivets R, is mounted on a shaft 46 which passes through a hub 44 located in a vertically upstanding bracket 43 mounted on the head frame 10. At the inner or right-hand end of hopper shaft 46 is mounted a ratchet wheel 48 which is keyed for rotation with shaft 46. Rotation of the ratchet wheel 48 will rotate the shaft 46 and the hopper 47. On the front side of bracket 34 is mounted, as by screws, a solenoid 49 which is a commerically known "pusher" type which is capable, when energized, to eject a rod 50 to the left as viewed in Fig. 2. Rod 50 is pivotally secured to the lower arm of a two-armed lever 51, which is mounted for free rotation upon shaft 46. On the upper arm of the two-armed lever 51 is mounted a spring pressed pawl 53 which engages the ratchet wheel 48. Movement of the two-armed lever 51 in a clockwise direction will result in pawl 53 engaging the teeth of ratchet wheel 48 and compelling a rotation thereof. On the other hand, movement of the two-armed lever in a counterclockwise direction will result in pawl 53 slipping idly backwardly over the teeth of the ratchet wheel 48 without tending to cause any rotation thereof.

Upon consideration of Fig. 2, it will be seen that when the hopper solenoid 49 is energized, it will quickly throw rod 50 outwardly to the left to cause a clockwise rotation of the two-armed lever 51 whereby the spring pressed pawl 53 will compel a partial rotation of the ratchet wheel 48. This will cause a similar partial rotation of shaft 46 and hopper 47 whereby additional rivets will be fed or dropped from the hopper 47 onto the supply rails 54 to slide downwardly by gravity in the direction of rivet setting.

A return tension spring 55 is mounted on the front side of bracket 34 and is secured to the outermost end of rod 50. Tension spring 55 is not strong enough to overcome the force exerted by the energized solenoid 49 but, when solenoid 49 is de-energized it will assert itself and cause rod 50 to be withdrawn to its initial retracted position within the hopper solenoid 49. This wall cause a counterclockwise rotation of the two-armed lever 51 whereby the spring pressed pawl 53 will slip idly backwardly over the teeth of the ratchet wheel 48, without causing any rotation thereof. Thus, the pawl 53 is also returned to its initial position and is again in readiness for a work stroke.

The rivets which were released by the supply hopper 47 will slide down the rivet supply rails 54 until they are stopped by the solenoid operated shuttle escapement mechanism 56. Usually, a sufficient number of rivets will be released from the hopper 47 so that several of them will back up in aligned order upon the rails 54. Should the rivets R be fed to the rivet setting position in too close order, considerable difficulties will arise and hence the shuttle escapement mechanism 56 is employed to select the rivets individually and to release them one at a time for the rivet setting operation.

As shown in Fig. 2, a solenoid 60 is secured to a bracket 58 which is mounted on a vertical ledge 57 on the underside of the head frame 10. Solenoid 60 is a commerically known "pusher" type which is adapted, when energized, to eject rod 61 to the left as shown in Fig. 2. The left-hand end of rod 61 is enlarged to a rectangular cross-section which is so situated that portions thereof underlie the slide rails 54 and other portions thereof are adapted to overlie the slide rails 54. Two cam members 62 and 63 of the rectangular section of rod 61 overlie and slide directly on the rails 54 and comprise the escapement means proper whereby one rivet is selected and released at a time.

In Fig. 3, the solenoid 60 being in energized position, the rod 61 is shown in its farthest right-hand position. A rivet R is shown on the upper horizontal portion of cam member 63. When the solenoid 60 is de-energized, a spring flex 64 mounted upon bracket 57 is provided to return the rod 61 to its original retracted position within the solenoid 60. During this return, rod 61 as viewed in Fig. 3, will be moving to the left. Cam member 62 will pick off the lowermost rivet R, which is shown resting upon the cam member 63 and this rivet will be permitted to slide down a lower extension 20 of the supply rails to fall into position directly below the rivet driver 14. At the same time, the horizontal portion 65 of the cam member 62 will prevent the aligned rivets in the rails 54 from dropping.

When the solenoid 60 is again energized, it will move rod 61 to the right as viewed in Fig. 3. When the horizontal portion 65 of cam member 62 has cleared the rails 54, all of the rivets on the rails 54 will drop a distance equal to one rivet and the lowermost rivet will fall directly onto the horizontal portion of the cam member 63 and be in readiness to be picked off by the cam member 62 when the soleniod 60 is again de-enerigized.

The rivet selected by the escapement device 56 will slide down the rails 20 and drop into position between the separable rivet jaws 16 directly below the rivet driver 14. The setting of the rivet R is accomplished by the driver 14 and the opposed top surface of the anvil 18, the vertical positioning of which is dependent upon the extent of vertical movement imparted to the driver 14 by the toggle links 24, 26.

In the preferred embodiment of the present invention it has been determined that rivet setting is initiated when the toggle links 24 and 26 make angles of 14½° with the vertical, or 151° with each other, and that rivet setting is completed when the toggle links are in alignment. The initial point of rivet setting, however, may be varied considerably, depending upon the type of rivet used and the degree of rivet setting desired.

If the throw of the ram 28 of the power solenoid 29 causes the toggle links 24 and 26 to pass their axis of alignment, no harmful effect is possible upon the rivet setting inasmuch as the driver 14 reaches maximum depth when the toggle links 24 and 26 are aligned and any further movement of the toggle links beyond that point merely causes the driver to recede slightly from the head of rivet R on the anvil 20.

In Fig. 4 is shown a wiring diagram of the present invention. A source of electrical power, such as 115 volts A. C. is controlled by the main switch 75. A timer is then inserted in the main line and a foot switch 77 is controlled by the operator of the riveting machine. The timer is a conventional time-delay relay set to operate to break the electric circuit after a predetermined period of time has elapsed and employs the basic principle of a condenser charging and discharging action. The hopper solenoid 49 and the shuttle solenoid 60 are in the alternating current circuit, whereas the power solenoid 29 is connected through a bridge type full wave rectifier 76 and operates on direct current.

The operation of the electromagnetic riveting machine is as follows: the foot switch 77 is closed momentarily by the operator, and all solenoids are energized. Power solenoid 29 ejects its ram 28 to impel extension link 27 to straighten the toggle links 24 and 26 and force the driver 14 downwardly. The driver 14 strikes the awaiting rivet R, drives it downwardly through the materials to be riveted and roll sets the rivet R in its place. At the same time, the hopper solenoid 49 ejects its rod 50 to rotate the hopper barrel 47 through the angular distance determined by the pawl and ratchet action and thus usually drops one or more rivets onto the chute rails 54. Similarly, the shuttle solenoid 60 ejects its rod 61 but such action merely moves the cam members 62, 63 to the right in Fig. 3 and thus merely drops a rivet R onto the flat upper surface of member 63 and does not feed any rivet to the rivet jaws 16 which are functioning at that moment.

A timing device, as shown in Fig. 4, is provided to insure that the circuits, once closed, will remain closed for a predetermined period of time in order to complete the roll setting of the rivet. Thus, the operator merely has to close the foot switch 77 momentarily and the timer will automatically keep the circuits closed for the proper time. Should the operator keep the foot switch closed for too long a time, due to inattention or carelessness, the timer will automatically open the circuits at the required time regardless of the fact that the foot switch has remained closed. Such timing devices are well known in the industry and the specific details of construction thereof should require no further discussion.

After the above operations the solenoids are de-energized by the timer-break of the circuit, the return spring 30 retracts the power ram 28 which creates an angular configuration of the toggle links 24 and 26 to withdraw the driver upwardly from the rivet jaws 16, and thus hold it in readiness for another power stroke. As for the rotating hopper barrel 47, the return spring 55 retracts the rod 50 whereby the pawl 53 slips idly backwards over the ratchet wheel 48 and is again in position to perform a working stroke. In the case of the shuttle mechanism, the spring flex 64 returns the rod 61 to the left in Fig. 3 and thus allows one rivet R to drop onto the rails of the chute 20 and to slide downwardly and drop into riveting position within the rivet jaws 16 and await the downward stroke of the driver 14. Thus, all parts have undergone a complete cycle and are again at the initial point.

In the wiring diagram noted in Fig. 4, the hopper solenoid 49 and the shuttle solenoid 60 are in the alternating current circuit and the power solenoid 29 is connected through a bridge type full wave rectifier 76 and is in a direct current circuit. If it is desired, the rectifier may be omitted and all three solenoids may be supplied with alternating current, depending upon the power requirements of the power solenoid 29. In many cases, such as in the roll setting of smaller rivets, it is more desirable to do so to simplify the electrical wiring requirements and also obviate the necessity of the rectifier, due to the reduction of the power requirements.

As shown in Fig. 2, the power solenoid 29 is positioned at an angle of 60° from the vertical and acts upon the rivet driver 14 through the agency of the toggle linkage 24, 26. Due to the mechanical action and advantage of such a linkage, a considerable amount of force can be exerted upon the rivet during rivet setting and such a toggle linkage has proved extremely beneficial. Other linkages or kinematic devices possessing similar mechanical advantage factors could also be used, however, without departing from the concept of the present invention.

When rivets of a smaller diameter are to be roll set, the power requirements upon the power solenoid 29 are not so great and the need for obtaining mechanical advantage by means of linkages and similar arrangements is not so pressing. In such an event, the rivet setting machine may be employed in its modified form as shown in Figs. 5 and 6.

As shown in Fig. 5, the power solenoid 29' is mounted on a bracket 34' directly over and axially aligned with the rivet driver 14' with the direction of movement of the power ram 28' in line with the axis of the rivet driver 14'. The power solenoid 29' is of a commercially known "pusher" type. The lower end of the power ram 28' is secured to the upper end of the rivet driver 14' so that, when the power solenoid 29' is energized to suddenly plunge the power ram 28' downwardly, such downward movement results in a work stroke of the rivet driver to roll set a rivet between the lower end of said rivet driver and the opposed anvil 18'.

In this modification, the power ram 28' can be rigidly secured to the upper end of the rivet driver 14' inasmuch as both elements have a vertical reciprocation which is simple and not made complicated by the addition of linkages or other mechanical arrangements. Power ram 28' may be, if desired, welded or otherwise positively secured to the upper portion of the rivet driver 14'.

A compression spring 30' encircles the rivet driver 14' and is confined between a spring seat washer located on the upper face of the head frame 10' and a spring seat washer 32' secured to the power ram 28'. The strength of compression spring 30' is such as not to interfere materially with the force exerted during the downward power stroke of the rivet driver during energization of the power solenoid 29' but is sufficient to return the rivet driver 14' and its associated power ram 28' to its upper, or readiness, position.

The rivet driver 14' is slidingly guided through the head frame 10' by means of a suitable bushing and bearing surface 12' to provide for a smooth powerful downward work stroke and an easy upward spring-returned stroke.

Due to the fact that a smaller rivet is now being used with a lesser demand for power; plus the fact that no mechanical advantage device is employed to obtain an overpowering force; the need for an overload absorber no longer is considered absolutely essential. Normally, the force exerted does not result in sufficient surplus power over and above that required for roll setting to endanger the rivet setting machine. However, a determination of the power requirements for rivet setting and a selection of the proper power solenoid should be carefully made when the overload absorber is omitted to avoid the possibility of the existence of the surplus power to too great an extent.

However, should a rivet of such size be used in conjunction with an electromagnetic device of sufficient power, an overloader absorber could be employed. Such a device would be a very simple adjunct, such as a resilient mounting for the power solenoid 29' to permit yielding upwardly, should the conditions and circumstances demand it.

All three solenoids of the modified rivet setting machine may be in the alternating current circuit, if the power requirements of the power solenoid 29' permit such arrangement. If more power is required by the power solenoid 29', then resort may be made to the bridge type full wave rectifier to supply that solenoid with direct current and, concomitantly, with greater force.

The operation of the modification shown in Figs. 5 and 6 is, of course, basically very similar to that shown in Figs. 1–4. Energization of the power solenoid 29' will impel the solenoid power ram 28' downwardly against the weak resistance of compression spring 30'. The rivet driver 14' will be suddenly and powerfully urged downwardly within the bushing and bearing element 12' in head frame 10' to roll set the rivet R which had been previously positioned in the rivet jaws 16' above the opposed anvil 18'.

When the power solenoid 29' is de-energized, the compression spring 30' is able to exert sufficient upward force to return the rivet driver 14' and the power ram 29' to their upper, or readiness, position.

All other operations of the machine in the modified form are similar to those described in connection with Figs. 1–4 and it is not believed that a repetition of such operations is necessary.

Although this invention has been described and illustrated with specific reference to the use of a solenoid supplying the power either directly, or indirectly through linkages, for the work stroke of the movable rivet driver, this is not intended as limitative strictly of the scope of the invention, or to preclude the use of other means connected to the rivet driver to supply a magnetic force to produce the power for the work stroke. Other means, such as an electromagnet, operated by a source of direct current, have been employed to supply the requisite magnetic force directly upon opposed magnetic bodies to create the force required in the work stroke of the movable rivet driver.

As is evident from the above description of the invention, power to energize the solenoids or other magnetic devices is drawn and used only during the actual riveting step. Constantly rotating parts such as flywheels, crank shafts and cams are obviated and a simple reciprocating motion is substituted therefor. Pneumatic means and its concomitant difficulties of a supply tank, air hose and connections are avoided by use of simple electrical wiring. No complex mechanical parts are involved and the operation and maintenance are accordingly simplified, without any loss of dependability or quality.

Variations and modifications may be made within the scope of the claims and portions of the improvements may be used without others.

I claim:

1. A machine for setting a rivet comprising in combination: a movable rivet driver; an opposed anvil for said driver, said anvil having a surface for setting a rivet; a direct-current solenoid supplying the power to impart a work stroke to said movable rivet driver; a source of alternating current; means supplying full-wave rectified current to the direct-current solenoid from said source of alternating current; a hopper barrel containing a supply of rivets; an alternating-current solenoid; means including a cooperating linkage to impart intermittent rotation to said hopper barrel in response to repeated energization of said alternating current solenoid, to feed rivets for the rivet setting operation; means for connecting said alternating-current solenoid to said source of alternating current; and switch means connected to the source of alternating current, providing for simultaneous energization of said solenoids at the will of an operator.

2. A machine for setting a rivet comprising in combination: a movable rivet driver; an opposed anvil for said driver, said anvil having a surface for setting a rivet; a direct-current solenoid supplying the power to impart a work stroke to said movable rivet driver; a source of alternating current; means supplying full-wave rectified current to the direct-current solenoid from said source of alternating current; a shuttle escapement means for rivets; an alternating-current solenoid; means to reciprocate said shuttle escapement means in response to repeated energization of said alternating current solenoid to feed rivets individually to the rivet setting operation; means for connecting said alternating-current solenoid to said source of alternating current; and switch means connected to the source of alternating current, providing for simultaneous energization of said solenoids at the will of an operator.

3. A machine for setting a rivet comprising in combination: a movable rivet driver; an opposed anvil for said driver; a direct-current solenoid supplying the power to impart a work stroke to said movable rivet driver; a source of alternating current; means supplying full-wave rectified current to the direct-current solenoid from said source of alternating current; a hopper barrel containing a supply of rivets; an alternating-current solenoid; means to impart intermittent rotation to said hopper barrel in response to repeated energization of said alternating-current solenoid, to feed rivets; a second alternating-current solenoid; a shuttle escapement means to receive the rivets fed from said hopper barrel and to feed the same individually to the rivet setting operation, said escapement means being actuated by said second alternating-current solenoid; and circuit means connecting the alternating-current solenoid to said source of alternating current and including a switch to coordinate the action of all the solenoids.

References Cited in the file of this patent

UNITED STATES PATENTS

| | | |
|---|---|---|
| 779,427 | Jessop | Jan. 10, 1905 |
| 1,656,730 | Hanna | Jan. 17, 1928 |
| 1,769,697 | Kuhn | July 1, 1930 |
| 2,179,900 | Sheane | Nov. 14, 1939 |
| 2,189,296 | Oskow | Feb. 6, 1940 |
| 2,361,810 | Bazley | Oct. 31, 1944 |

FOREIGN PATENTS

| | | |
|---|---|---|
| 23,495 | Great Britain | Oct. 14, 1909 |